(12) United States Patent
Ross, Jr. et al.

(10) Patent No.: US 7,079,037 B2
(45) Date of Patent: Jul. 18, 2006

(54) SYSTEM AND METHOD FOR INDICATING LIQUID LEVEL CONDITION

(76) Inventors: Herbert G. Ross, Jr., 140 Fawn Hollow Dr., Argyle, TX (US) 76226; Bud Wilcox, 13395 Bass Trail, Grass Valley, CA (US) 95945

( * ) Notice: Subject to any disclaimer, the term of this patent is extended or adjusted under 35 U.S.C. 154(b) by 215 days.

(21) Appl. No.: 10/860,954

(22) Filed: Jun. 4, 2004

(65) Prior Publication Data

US 2005/0269532 A1    Dec. 8, 2005

(51) Int. Cl.
*G08B 21/00* (2006.01)
(52) U.S. Cl. .................. 340/618; 340/612; 340/616; 340/625; 73/1.16; 73/1.31; 73/1.73; 73/290 R; 73/293; 116/109; 116/227
(58) Field of Classification Search ............... 340/517, 340/521, 523, 540, 603, 612, 616, 618, 619, 340/625; 73/1.16, 1.31, 1.73, 290 R, 293; 116/109, 227
See application file for complete search history.

(56) References Cited

U.S. PATENT DOCUMENTS

| | | | |
|---|---|---|---|
| 4,688,028 A | 8/1987 | Conn | |
| 5,265,032 A | 11/1993 | Patel | |
| 6,041,650 A | 3/2000 | Swindler et al. | |
| 6,490,922 B1 | 12/2002 | Sprea et al. | |
| 6,581,461 B1 | 6/2003 | Diaz | |
| 6,968,739 B1* | 11/2005 | Baron et al. ................ | 73/293 |
| 2002/0124643 A1* | 9/2002 | Robinson ................... | 73/290 R |
| 2005/0056092 A1* | 3/2005 | Kowalski .................... | 73/313 |
| 2005/0237210 A1* | 10/2005 | McSheffrey et al. ........ | 340/614 |

OTHER PUBLICATIONS

"Magnetic Liquid Level Gauges for LP Gas Service" brochure, Rochester Gauges, Inc, Jul. 1, 2002.
"Rochester Remote Ready Dial & Hall Effect Module" brochure, Rochester Gauges, Inc. Jan. 19, 2004.
"Rochester Remote Ready Dial & Reed Switch Module" brochure, Rochester Gauges, Inc. Jan. 26, 2004.
"Ready. When you are." R3D Advertisement, Rochester Gauges, Inc. (no date).
"Centeron Wireless Tank Monitoring System" brochure, Robertshaw Industrial Products (no date).

* cited by examiner

*Primary Examiner*—Thomas J. Mullen, Jr.
*Assistant Examiner*—Samuel J Walk
(74) *Attorney, Agent, or Firm*—Alvin R. Wirthlin (57) ABSTRACT

An indicator for displaying either low liquid level or satisfactory liquid level conditions within a tank includes a sensor for detecting the liquid level conditions, a photodetector for detecting an ambient dark condition, a pair of indicator lights for indicating either the low liquid level or satisfactory liquid level conditions, and electrical circuitry operable to illuminate one of the indicator lights upon detection of the ambient dark condition by the photodetector and detection of either the low liquid level condition or satisfactory liquid level condition by the sensor.

26 Claims, 6 Drawing Sheets

SYSTEM AND METHOD FOR INDICATING LIQUID LEVEL CONDITION

BACKGROUND OF THE INVENTION

This invention relates to monitoring liquid level in tanks, and more particularly to a system and method for indicating a liquid level condition within a tank.

The determination of liquid level within LPG or fuel oil tanks is typically performed by a mechanical float-type gauge that extends into the tank. One type of gauge is disclosed in U.S. Pat. No. 6,041,650 to Swindler, et al., and includes a movable float arm coupled by gears to the lower end of a rotatable shaft. A magnet is mounted to the upper end of the shaft and extends into a passage of a gauge head for magnetic coupling with a level indicating dial. A change in liquid level within the tank causes movement of the float arm and thus rotation of the indicating dial to thereby show the amount of liquid within the tank.

Although the above-described system is adequate for indicating liquid level, it is often inconvenient for will-call status customers, i.e. those that must call a fuel supply company for tank refill, to read the gauge head. For stationary tanks, a person must exit the building, approach the tank and move a cover that extends over the gauge head and other fittings in order to ascertain whether or not a fuel supply company should be contacted for refilling the tank. Consequently, many stationary tanks run out of fuel at the most inconvenient times, such as during heating, cooking, bathing, and so on. However, such inconveniences pale in comparison to potentially more serious consequences, such as frozen pipes during winter conditions and the attendant damage and repair costs, health degradation among the young, elderly, sick and invalid when exposed to low temperature conditions, and so on. The difficulty in ascertaining fuel level within the tank is exacerbated during harsh winter months where the desire or effort to read the gauge is dampened, especially when ice or snow is present, or simply at any time when one feels that weather conditions are unfavorable for such a task.

Accordingly, there is a need to facilitate the determination of a low liquid level condition within a fuel tank or the like from a remote location, such as from a window inside a home or other convenient viewing location, in time for an observer to alert a fuel provider of the need to refill the tank.

BRIEF SUMMARY OF THE INVENTION

According to one aspect of the invention, an indicator for displaying a liquid level condition within a tank is provided. The indicator includes a sensor for detecting at least one of a first liquid level condition and a second liquid level condition. The first liquid level condition occurs at a predetermined low liquid level within the tank and the second liquid level condition occurs at a liquid level above the first liquid level condition. The indicator further includes a photodetector for detecting at least an ambient light condition and an ambient dark condition, a first indicator light for indicating at least one of the first and second liquid level conditions, and electrical circuitry electrically connected to the sensor, the photodetector and the first indicator light. The electrical circuitry is operable to illuminate the first indicator light upon detection of the ambient dark condition by the photodetector and detection of one of the first and second liquid level conditions by the sensor.

According to a further aspect of the invention, a method for displaying a liquid level condition within a tank includes providing at least one indicator light, detecting at least one of a first liquid level condition and a second liquid level condition, the first liquid level condition occurring at a predetermined low liquid level within the tank and the second liquid level condition occurring at a liquid level above the first liquid level condition, detecting at least one of an ambient light condition and an ambient dark condition, illuminating the first indicator light upon detection of the ambient dark condition and detection of one of the first and second liquid level conditions by the sensor.

BRIEF DESCRIPTION OF THE DRAWINGS

The foregoing summary as well as the following detailed description of the preferred embodiments of the present invention will be best understood when considered in conjunction with the accompanying drawings, wherein like designations denote like elements throughout the drawings, and wherein.

It is noted that the drawings are intended to depict only typical embodiments of the invention and therefore should not be considered as limiting the scope thereof. It is further noted that the drawings may not be necessarily to scale. The invention will now be described in greater detail with reference to the accompanying drawings.

DETAILED DESCRIPTION OF THE INVENTION

Figure 1:
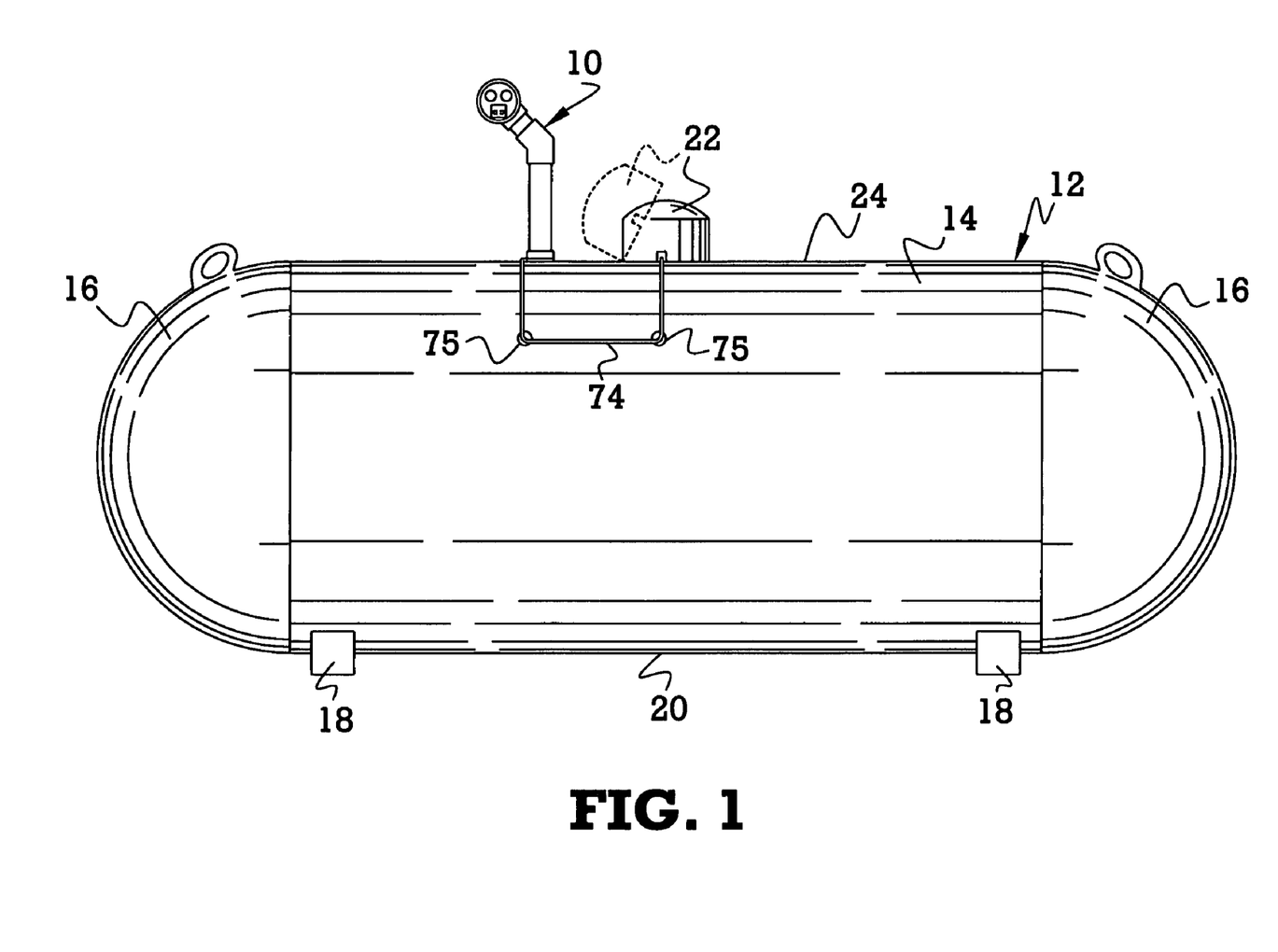
FIG. 1 is a front elevational view of an indicator for displaying liquid level mounted on a tank in accordance with the invention.

Referring to the drawings and to FIG. 1 in particular, an indicator 10 for displaying liquid level within a tank 12 in accordance with the present invention is illustrated. The tank 12 as shown includes a generally tubular tank portion 14 integrally connected to generally semi-spherical end portions 16 in a hermetically sealed arrangement. Feet or legs 18 are provided at the bottom 20 of the tank 12 for supporting the tank, while a cover 22 is hingedly connected to the top 24 of the tank to alternatively protect and expose various tank components, such as a gauge head dial 26 (FIG. 6), filling valves and/or pressure relief valves (not shown), and other well-known tank components.

Although the indicator 10 can be mounted at any position or orientation with respect to the tank 12, it is preferred that the indicator be mounted generally at the top 24 of the tank behind the cover 22 at a sufficient distance to allow opening of the cover without interference, as illustrated by dashed line in FIG. 1. Placement of the indicator 10 behind the cover 22 also deters damage to the indicator during tank filling or servicing. Although the indicator 10 of the present invention is particularly advantageous when used in conjunction with outdoor LPG or other fuel tanks, it will be understood that other tank types and/or shapes can be used, and that the level of other liquids can be detected and displayed.

Figure 2:
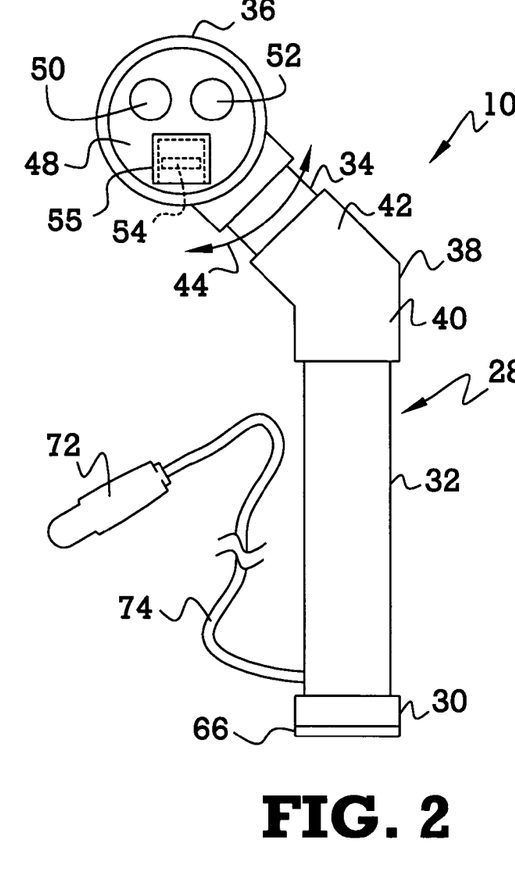
FIG. 2 is a front elevational view of the indicator of FIG. 1.
Figure 3:
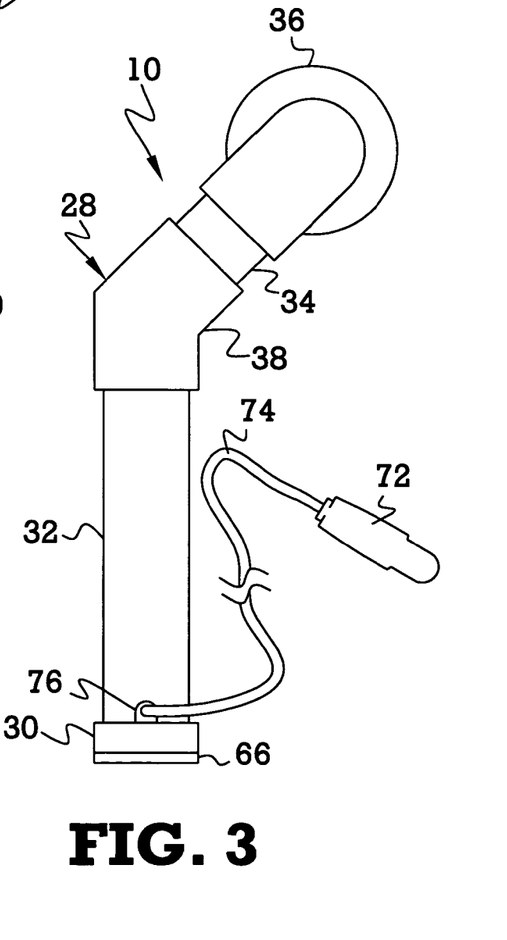
FIG. 3 is a rear elevational view of the indicator.
Figure 4:
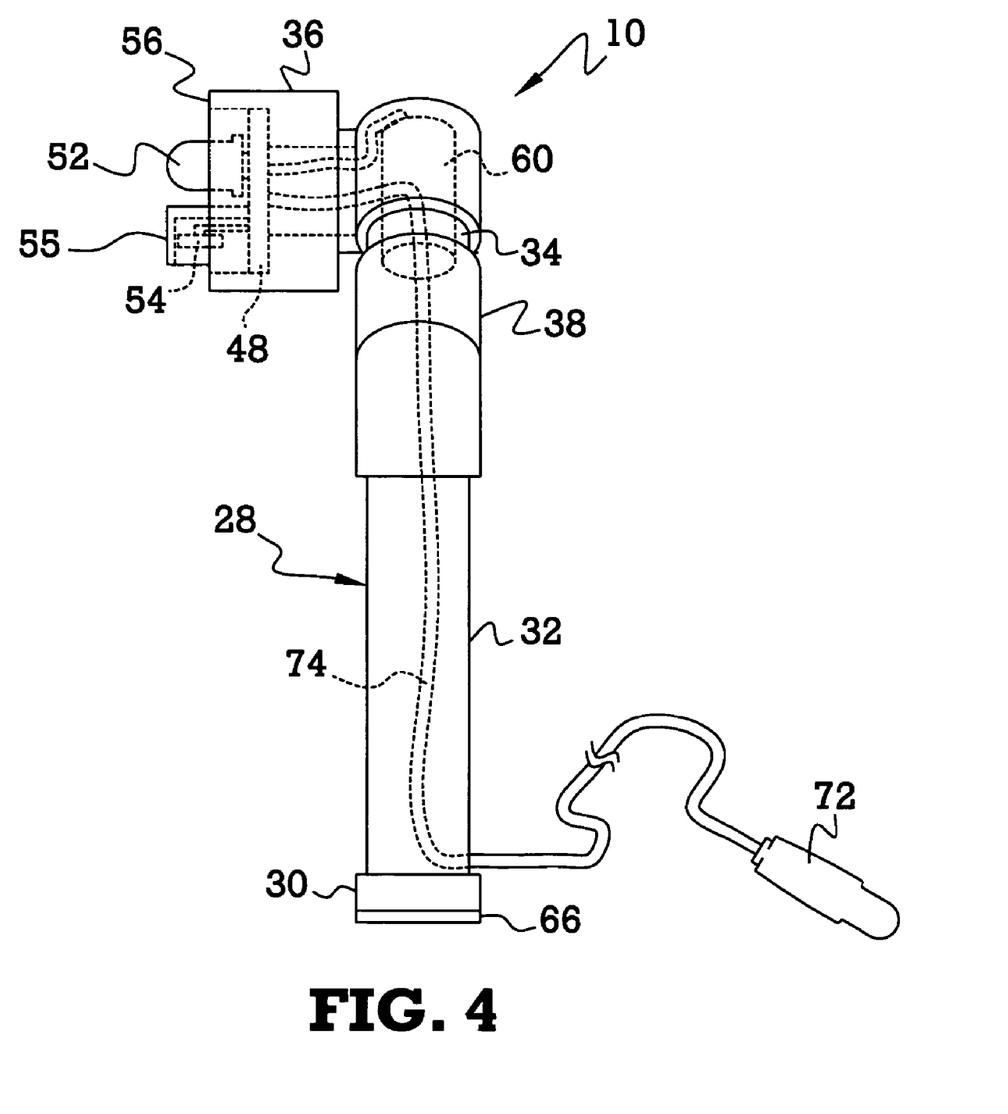
FIG. 4 is a side elevational view of the indicator.

With reference now to FIGS. 2–4, the indicator 10 preferably includes a housing 28 comprising a disk-shaped base portion 30, a first tubular member 32 extending from the base portion 30, an elbow portion 38 connected to an upper end of the first tubular member and to a lower end of a second tubular member 34, and a display portion 36 connected to an upper end of the second tubular member 34. The elbow portion 38 has a first section 40 that telescopically receives the upper end of the first tubular member 32 and a second section 42 that telescopically receives the lower end of the second tubular member 34. Preferably, the first and second sections 40, 42 form an angle of approximately 45 degrees so that the second tubular member 34 extends at a 45 degree angle with respect to the first tubular member 32. It will be understood, however, that the first and second sections may extend at any angle. In accordance with a further embodiment of the invention, the elbow portion and second tubular member may be eliminated and the display portion 36 be directly connected to the first tubular member 32.

The display portion 36 is preferably rotatably mounted to the second tubular member 34, as represented by arrow 44, in order to adjust the position or viewing angle of the display portion with respect to a remote viewing location. In addition, the first tubular member and/or second tubular member may have telescopic sections (not shown) to adjust the height and position of the display portion 36.

In accordance with a further embodiment of the invention, the base portion and first and second tubular members may be integrally formed as a single unit through injection molding or other known processes.

As best shown in FIGS. 2 and 4, a circuit board 48 is mounted in the display portion 36 and includes first and second indicator lights 50 and 52 preferably of the high-intensity LED type, a photodetector 54 (shown in hidden line) located behind a cap or cover 55, as well as other electrical components as will be described in greater detail below in conjunction with FIG. 7.

The photosensor 54 preferably extends beyond a forward edge 56 of the display portion. Accordingly, the cap 55 serves to protect the photodetector 54 from the direct rays of the sun and other light sources which might induce false signals, against damage from inadvertent contact, and against environmental factors such as rain, ice, and snow. It will be understood that the cap 55 can be eliminated and that the photodetector may be recessed in the display portion 36.

The first and second indicator lights 50, 52 also preferably extend beyond the forward edge 56 of the display portion 36. However, it will be understood that the indicator lights 50 and 52 can also be recessed within the display portion 36. Although the size of the indicator lights can vary, it has been found that the larger variety, such as five and/or ten millimeter high intensity LED's, are adequate for determining the liquid level condition from a distance for many tank installations. Under normal operating conditions, it is anticipated that the first and second indicator lights will be seen at a distance up to 500 feet. Preferably, a conformal coating (not shown) is applied to the exposed side of the circuit board and the electrical components within the display portion 36 to protect the electronics from dirt, moisture, and other unfavorable environmental conditions.

A battery 60 (shown in hidden line in FIG. 4) is located in the second tubular member 34 for providing electrical power to the circuit board 48 and its various components. Preferably, the battery 60 is of the lithium type, but may be of other construction that exhibits extended operational life.

Figure 5:
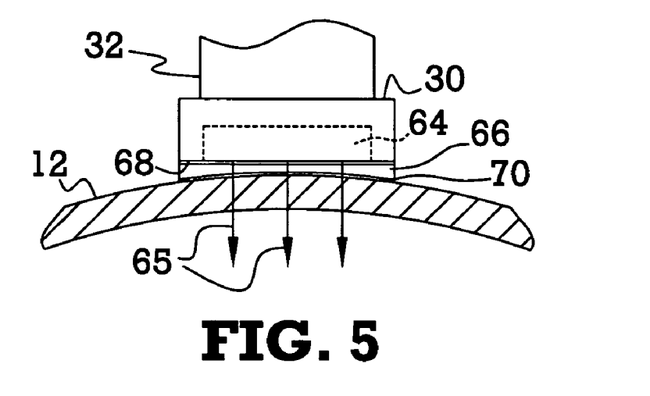
FIG. 5 is an enlarged view of a lower portion of the indicator illustrating the manner in which the indicator is mounted on the tank.

As best shown in FIG. 5, a magnet 64 (shown in hidden line) is located in the base 30 for mounting the indicator 10 to the tank 12. A soft, flexible mounting pad 66 is located at the bottom of the base 30 below the magnet 64. The mounting pad 66 preferably includes an upper adhesive layer 68 for securing the pad to the base 30 and a lower adhesive layer 70 for securing the indicator 10 to the tank 12. Since many tanks are curved as shown, the magnet 64 is in an unstable position and thus may not be sufficient by itself under different environmental conditions to securely hold the indicator 10 on the tank. In contrast, the flexible mounting pad 66 will tend to conform to the shape of the tank as the magnetic force (represented by arrows 65) draws the base 30 toward the tank. Consequently, the greater surface area contact together with the magnetic and adhesive forces create a secure, stable mounting arrangement between the indicator 10 and the curved wall of the tank 12.

Figure 6:
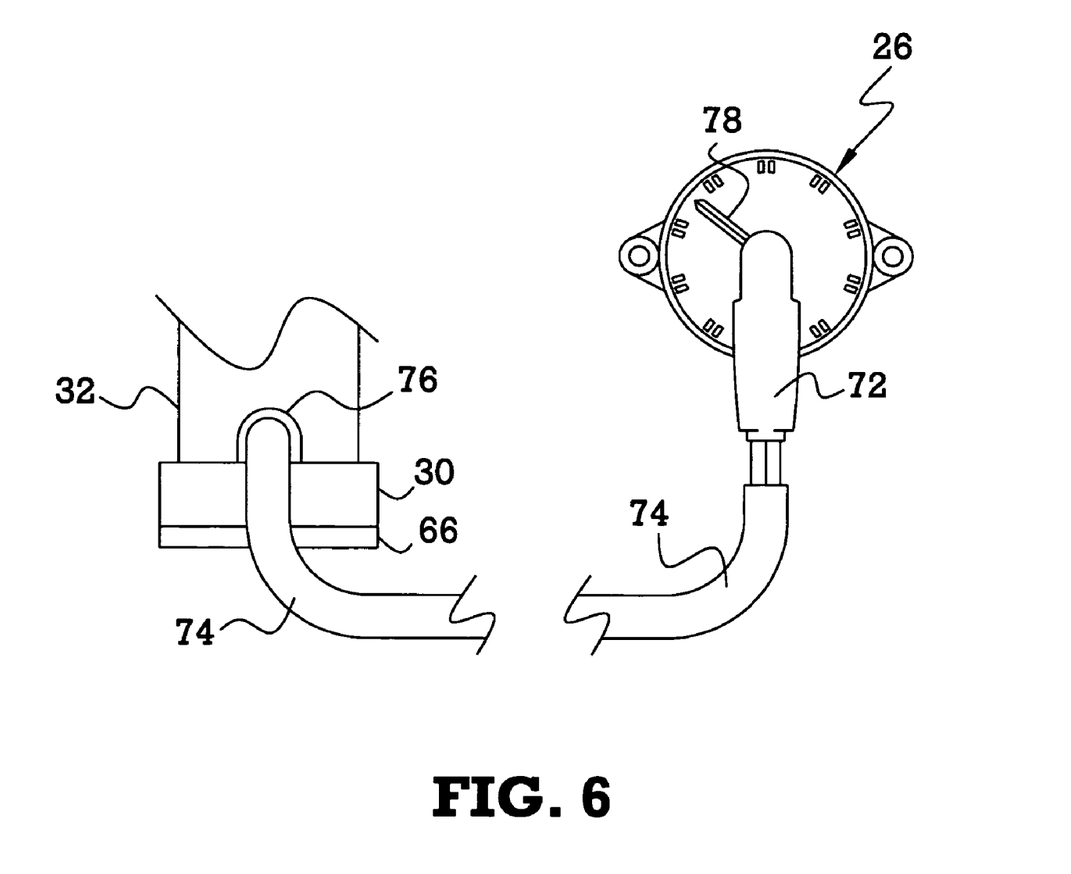
FIG. 6 shows the manner in which the indicator is connected to a gauge head mounted visual dial of the propane tank.

With reference now to FIGS. 4 and 6, a position sensor 72 is connected to the circuit board 48 via an electrical cable 74 that extends through the indicator housing 28. The cable 74 enters the housing 28 through an opening 76 formed in the first tubular member above the base portion 30. Preferably, the opening 76 is of sufficient size to discourage the formation of condensation inside the housing 28, or when moisture may be present, to permit its drainage out of the housing. When the indicator 10 is mounted to the tank 12, the electrical cable 74 can be secured to the tank by adhesive-backed cable ties 75 (FIG. 1) or other securing means.

As shown in FIG. 6, the position sensor 72 is preferably a potted reed switch, with a permanent magnet (not shown) that keeps the reed switch in a normally closed state. The magnet couples with the gauge 26 to switch between open and closed positions depending on the rotational position of a magnetically driven pointer 78 of the gauge dial. The magnetically driven pointer 78 rotates in response to a change in liquid level within the tank 12 in a well-known manner. A suitable gauge and switch combination is the Rochester Remote Ready Dial ($R^3D$) and Reed Switch Module by Rochester Gauges, Inc. of Dallas, Tex. The remote ready dial includes a magnetic pointer that rotates between empty and full positions in response to float movement inside a tank. The reed switch snap-fits into a recess in a lens of the remote ready dial and can be adjusted to switch at a predetermined low liquid level. Preferably, the reed switch is in a normally closed state and opens when the magnetic pointer 78 rotates to a position where its magnetic field opposes and offsets the magnetic field of the magnet in the proximity sensor 72, thereby causing the reed switch to open. It will be understood that the pointer 78 need not necessarily be aligned with the proximity switch in order to cause the switching action. The particular switch point can be adjusted by providing the pointer 78 with a predetermined magnetic strength and/or by providing the reed switch with a particular magnetic sensitivity. It will be understood that the reed switch can alternatively be of the normally open type that closes in response to pointer position. It will be further understood that the position sensor 72 can be embodied as an optical switch, a mechanical contact switch, and so on. Alternatively, the position sensor may be embodied as a magnetic pick-up device, such as a hall-effect sensor, to monitor the relative magnetic field as the pointer moves toward or away from the sensor. A particular sensed field strength can then be used as an indication of low liquid level.

Figure 7:
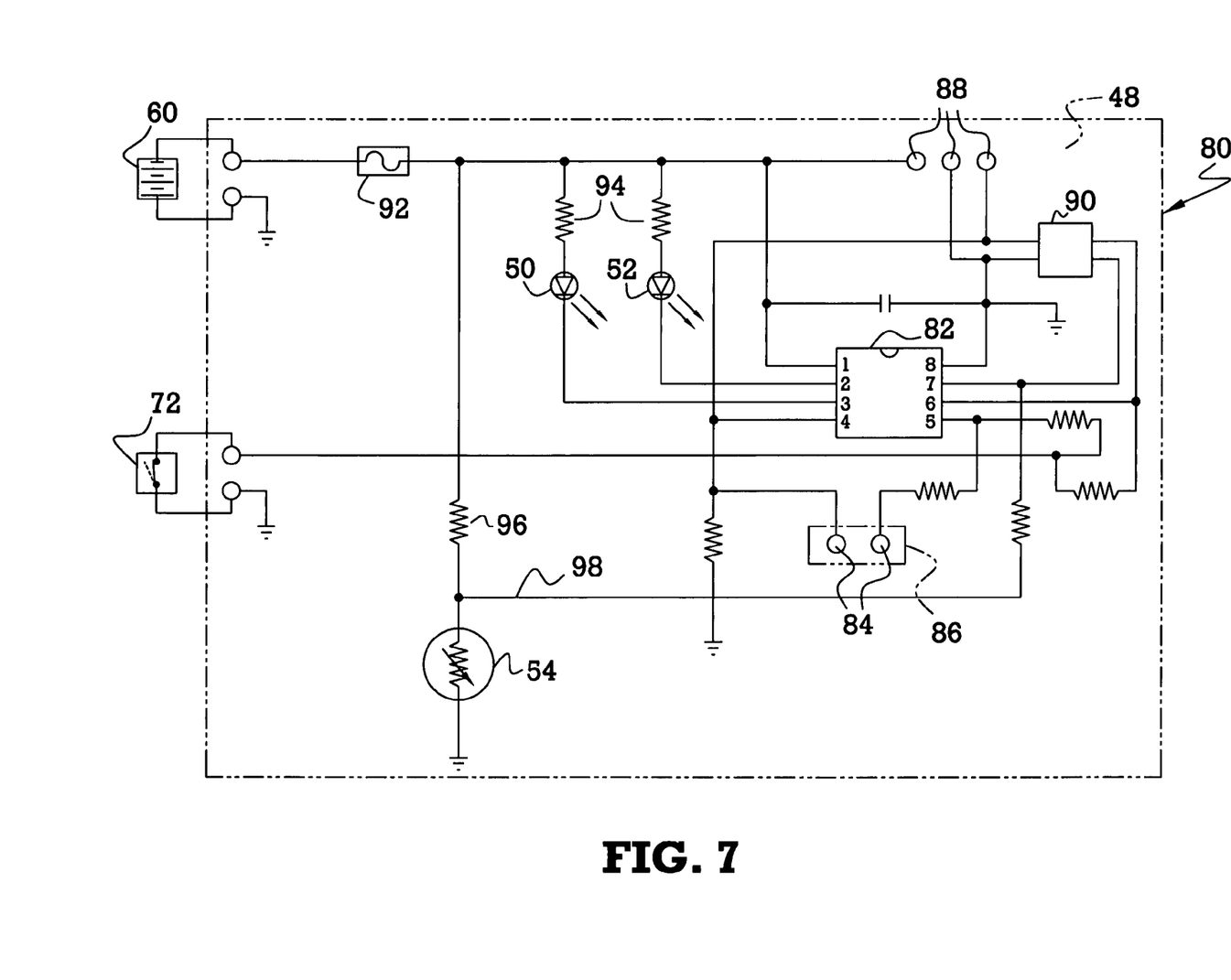
FIG. 7 is an electrical schematic of the indicator in accordance with the present invention.

Turning now to FIG. 7, electrical circuitry 80 for the indicator 10 is illustrated. The electrical circuitry 80 includes the circuit board 48 (shown in phantom line) with a processor, preferably in the form of a microcontroller 82, connected to the first indicator light 50, the second indicator light 52, the photodetector 54, the battery 60, and the position sensor 72. A suitable processor is preferably of the eight-bit microcontroller type, with eight pins or ports. Such a microcontroller is provided by Microchip Technology Inc., as part number PIC12F629. It will be understood that other processors, such as different types of microcontrollers, microprocessors, logic components, analog circuitry, and so on, may alternatively be used. The circuit board 48 also includes a pair of jumper pins 84 connected to pin 5 of the microcontroller through a removable jumper 86 (shown in phantom line) to adjust a signal delay time, as will be described in greater detail below with respect to FIG. 8. Test nodes or pins 88 and a four-pin header 90 may be provided and connected to ports 6-8 of the microcontroller to ensure that the circuitry 80 is functioning properly during testing or troubleshooting. A fuse 92 can also be provided in line with the positive voltage input from the battery 60 to protect the circuitry 80 against a faulty battery or other defective electrical condition.

The positive terminal of the battery 60 is connected to each of the indicator lights 50, 52 through a separate current-limiting resistor 94 connected in series with each indicator light 50, 52. The indicator lights 50, 52 are in turn connected to separate pins 2, 3 of the microcontroller 82, respectively. In order to illuminate the indicator lights when certain events have occurred, such as the detection of a low ambient light level for a predetermined time period and/or a low tank level, the microcontroller is programmed to switch each light on through its respective pin to thereby complete the electrical paths through the lights. Conversely, when the predetermined time period has ended and/or when the low level condition no longer exists, one or both indicator lights can be switched off.

The photodetector 54 is preferably in the form of a CdS photoconductive cell that changes resistance in response to a change in light intensity. A resistor 96 in series with the photodetector 54 creates a voltage divider with an output 98 connected to pin 7 of the microcontroller 82. As the resistance in the photodetector 54 changes, the voltage at the output 98 will change proportionately to produce a variable voltage that is present at pin 7. When the voltage reaches a predetermined value, the microcontroller 82 determines that a dark condition has been met, as will be described with reference to FIG. 8. It will be understood that the position of the photodetector 54 and resistor 96 can be reversed. It will be further understood that the present invention is not limited to the particular photodetector shown and described. In particular, other photodetectors, such as photodiodes, phototransistors, photovoltaic cells, and so on, may be used.

The position sensor 72 is connected to pin 5 of the microcontroller 82. When the position sensor 72 is in the form of a reed switch, and the microcontroller detects that the switch is open, the microcontroller then determines that a low level condition in the tank 12 exists. Conversely, the microcontroller determines that a low level condition has not been reached when the switch is closed.

Figure 8:
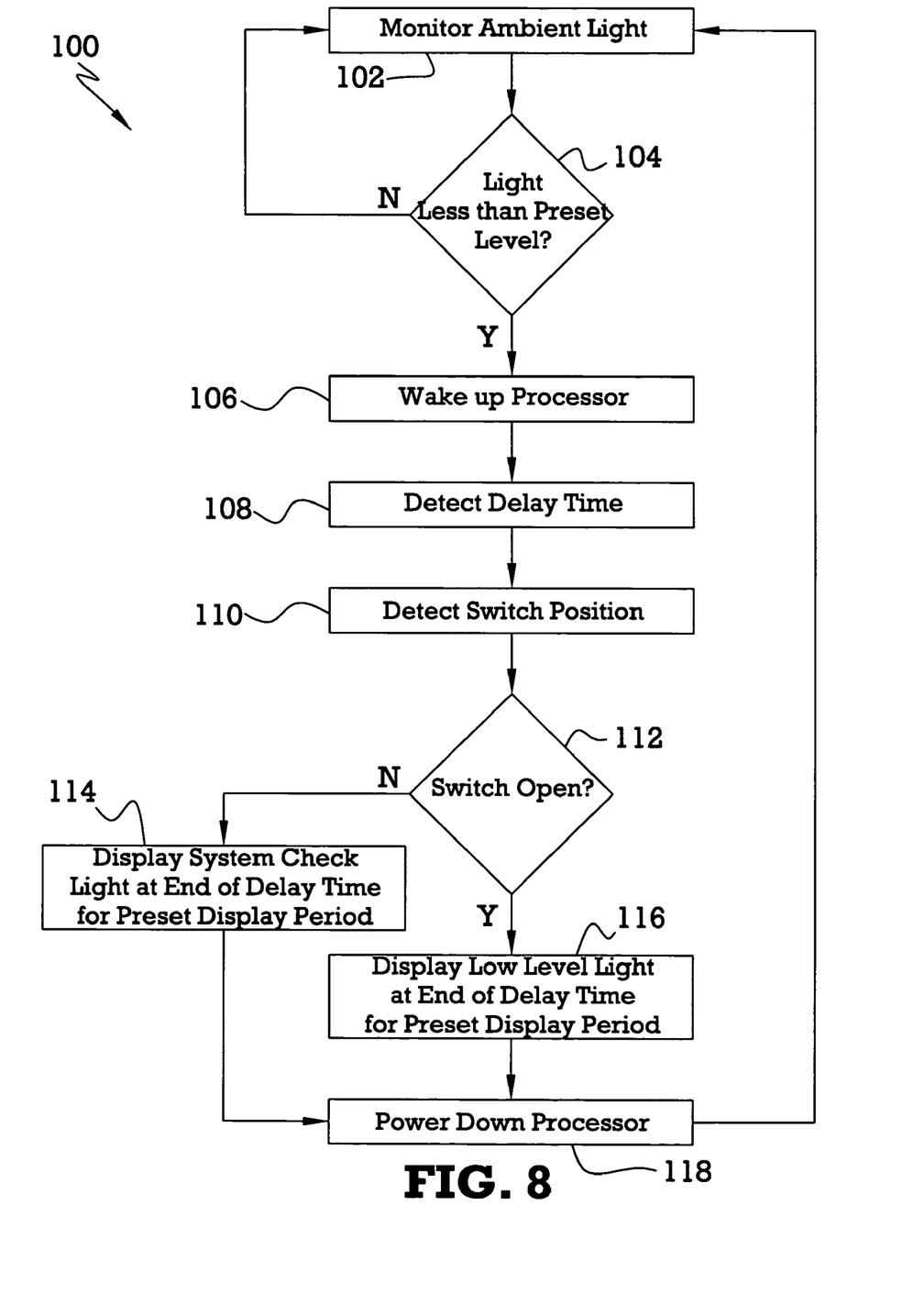
FIG. 8 is a flow diagram illustrating a method for displaying liquid level information.

With additional reference to FIG. 8, a method 100 of displaying a liquid level condition within the tank 12 is shown. In order to conserve battery power, the microcontroller 82 is normally in a sleep mode, and the indicator lights 50, 52 are normally off. As shown at block 102, the photodetector 54 monitors ambient light. At block 104, during daylight hours, the photodetector is in a low state and therefore no action is taken. However, when the ambient light is less than the predetermined level, such as at night, the photodetector is in a high state, and the microcontroller 82 is wakened from the sleep mode, as shown at block 106. Subsequently, the microcontroller determines a preset delay time before displaying the tank condition.

The preset delay time is determined by detecting the presence or absence of the jumper 86 across the pins 84 (FIG. 7). When the jumper is absent, the microcontroller is programmed to delay illumination of the appropriate indicator light for a first delay time. When the jumper is present, the microcontroller is programmed to delay illumination of the appropriate indicator light for a second delay time. By way of example, the first delay time may be preset for 30 minutes while the second delay time may be preset for 90 minutes. In this manner, an observer will know that the indicator 10 can be observed beginning at either 30 minutes or 90 minutes after dark, depending on the jumper setting. This feature is especially advantageous for persons arriving home from work or other activities after dark, adjusting for daylight savings time, a seasonal change in nightfall, and so on. A casual observation of the indicator 10 after the preset delay time will inform an observer of the tank level condition. The delay in displaying tank condition also ensures that the indicator lights can clearly be seen from a remote location under sufficient darkness since, during daylight hours, illumination of the indicator lights may not be as readily apparent. It will be understood that other delay times, as well as other means for presetting one or more delay times, can be used.

At block 110, the microcontroller detects the open or closed state of the liquid level switch 72. If at block 112 it is determined that the switch 72 is closed, there is sufficient liquid level within the tank which is then displayed at the end of the preset delay time, as shown at block 114. By way of example, the first indicator light 50 can be flashed once every twenty seconds for a preset display period, such as one hour, in order to further conserve battery power. The flash time during each twenty second interval can be, for example, approximately 300 milliseconds, although the actual flash time can greatly vary. Alternatively, the first indicator light may be held constantly on for the preset display period. Since the first indicator light 50 is a positive indication that the circuit is working properly and that no tank refilling is needed, it is preferable that the light 50 emits radiant energy at a wavelength in the visible green spectrum.

If at block 112 it is determined that the switch 72 is open, the contents of the tank 12 are at a low liquid level condition. By way of example, the low liquid level condition can be reached when the liquid level is approximately 25 to 30 percent of a full tank. In this manner, a fuel supply company can be contacted for refilling the tank before the tank runs out of fuel. When it is determined by the microcontroller that a low liquid level condition exists, the second indicator light 52 is illuminated at the end of the preset delay time, as shown at block 116. By way of example, the second indicator light 52 can be flashed once every fifteen seconds for a preset display period, such as one hour, in order to further conserve battery power. The flash time during each fifteen second interval can be, for example, approximately 500 milliseconds, although the actual flash time can greatly vary. Alternatively, the second indicator light may be held constantly on for the preset display period. Since the second indicator light 52 is a positive indication that the circuit is working properly and that tank refilling is needed, it is preferable that the light 52 emits radiant energy at a wavelength in the visible red spectrum.

At block 118, once the preset display period has passed, the microcontroller enters the sleep mode, until subsequent daylight and dark conditions are detected by the photodetector, as shown at block 102.

If neither of the indicator lights is illuminated at the end of the preset delay time for the preset delay period, an observer may readily ascertain that the indicator 10 is nonfunctioning, and may contact the fuel provider to make necessary repairs or replacement.

When a battery of sufficient power is used to energize the above-described circuitry, such as a lithium battery rated at approximately 2 Amp-hours with an output of approximately 3.0 to 3.6 volts, it is anticipated that the above-described circuitry with the specified components and its particular mode of operation will provide for a power budget that allows application of the indicator 10 in an outdoor environment with a minimum product life of approximately four years.

It will be understood that the particular number of flashes, the frequency of the flashes, the duration of each flash, the display period, and the particular wavelength of the indicator lights can greatly vary. Moreover, a bi-color LED may take the place of the two separate LED's for indicating the liquid level condition.

It will be understood that terms of orientation and/or position as may be used throughout the specification, such as upper, lower, top, bottom, below, forward, downward, and so on, refer to relative, rather than absolute orientations and/or positions.

It will be appreciated by those skilled in the art that changes could be made to the embodiments described above without departing from the broad inventive concept thereof. Although the present invention has been described in conjunction with LPG and similar tanks, it will be understood that other tank types and/or shapes can be used, and that the level of other liquids can be detected and displayed. It will be understood, therefore, that this invention is not limited to the particular embodiments disclosed, but it is intended to cover modifications within the spirit and scope of the present invention as defined by the appended claims.

We claim:

1. An indicator for displaying a liquid level condition within a tank, the indicator comprising:
   a sensor for detecting at least one of a first liquid level condition and a second liquid level condition, the first liquid level condition occurring at a predetermined low liquid level within the tank and the second liquid level condition occurring at a liquid level above the first liquid level condition;
   a photodetector for detecting at least an ambient dark condition;
   a first indicator light for indicating at least one of the first and second liquid level conditions; and
   electrical circuitry electrically connected to the sensor, the photodetector and the first indicator light, the electrical circuitry being operable to illuminate the first indicator light upon detection of the ambient dark condition by the photodetector and detection of one of the first and second liquid level conditions by the sensor.

2. An indicator according to claim 1, wherein the first indicator light indicates the first liquid level condition and verifies normal system operation, and further comprising a second indicator light for indicating the second liquid level condition, the electrical circuitry being connected to the second indicator light and being operable to illuminate the second indicator light upon detection of the ambient dark condition by the photodetector and detection of the second liquid level condition by the sensor.

3. An indicator according to claim 2, wherein the first and second indicator lights emit radiant energy at different wavelengths.

4. An indicator according to claim 1, wherein the electrical circuitry comprises a processor.

5. An indicator according to claim 4, wherein the processor is adapted to cause illumination of the first indicator light after a predetermined delay time from detection of the ambient dark condition.

6. An indicator according to claim 5, wherein the processor is adapted to cause illumination the first indicator light for a preset display period to thereby conserve electrical energy.

7. An indicator according to claim 6, wherein the processor is adapted to enter a sleep mode after the preset display period to thereby conserve electrical energy.

8. An indicator according to claim 7, wherein the processor is adapted to wake up from the sleep mode upon detection of the ambient dark condition by the photodetector.

9. An indicator according to claim 8, wherein the processor is adapted to cause the first indicator light to flash for a predetermined flash duration over a predetermined flash interval to thereby conserve electrical energy.

10. An indicator according to claim 9, wherein the tank comprises a liquid level gauge head dial with a magnetic pointer, and further wherein the sensor comprises a reed switch that is couplable to the gauge head dial and a permanent magnet for holding the reed switch in a normally closed position to thereby conserve battery power, the reed switch being adapted to move to the open position when the magnetic pointer rotates to a position where its magnetic field opposes and offsets the magnetic field of the sensor permanent magnet.

11. An indicator according to claim 6, wherein the processor is adapted to cause the first indicator light to flash for a predetermined flash duration over a predetermined flash interval to thereby conserve electrical energy.

12. An indicator according to claim 1, and further comprising a housing for holding the electrical circuitry, the housing have a magnetic base portion for mounting on a magnetically responsive tank.

13. An indicator according to claim 12, and further comprising a flexible adhesive pad mounted to the magnetic base portion for directly contacting and conforming to a curvature of the tank wall.

14. An indicator according to claim 12, wherein the housing further comprises a first tubular member connected to the base, a second tubular member connected to the first tubular member at an angle, and a display portion connected to the second tubular member.

15. An indicator according to claim 14, wherein the electrical circuitry and the at least one indicator light are mounted in the display portion.

16. An indicator according to claim 15, wherein the display portion is rotatable with respect to the second tubular member for aiming the at least one indicator light toward a predetermined location.

17. An indicator according to claim 1, wherein the tank comprises a liquid level gauge head dial with a magnetic pointer, and further wherein the sensor comprises a reed switch that is couplable to the gauge head dial and a permanent magnet for holding the reed switch in one of a closed and open position, the reed switch being adapted to move to the other of the closed and open positions when the magnetic pointer rotates to a position where its magnetic field opposes and offsets the magnetic field of the sensor permanent magnet.

18. An indicator according to claim 1, wherein the tank comprises a liquid level gauge head dial with a magnetic pointer, and further wherein the sensor comprises a hall-effect device that is couplable to the gauge head, the hall-effect device sensing when the magnetic pointer is at least in proximity thereto.

19. A method for displaying a liquid level condition within a tank, the method comprising:
  providing at least one indicator light;
  detecting at least one of a first liquid level condition and a second liquid level condition, the first liquid level condition occurring at a predetermined low liquid level within the tank and the second liquid level condition occurring at a liquid level above the first liquid level condition;
  detecting at least an ambient dark condition; and
  illuminating the first indicator light upon detection of the ambient dark condition and detection of one of the first and second liquid level conditions by the sensor.

20. A method according to claim 19, wherein the first indicator light indicates the first liquid level condition, and further comprising:
  providing a second indicator light for indicating the second liquid level condition; and
  illuminating the second indicator light upon detection of the ambient dark condition and detection of the second liquid level condition.

21. A method according to claim 19, and further comprising illuminating the first indicator light after a predetermined delay time from detecting of the ambient dark condition.

22. A method according to claim 21, and further comprising illuminating the first indicator light for a preset display period to thereby conserve electrical energy.

23. A method according to claim 22, and further comprising entering a sleep mode after the preset display period to thereby conserve electrical energy.

24. A method according to claim 23, and further comprising waking up from the sleep mode upon detection of the ambient dark condition.

25. A method according to claim 24, and further comprising flashing the first indicator light for a predetermined flash duration over a predetermined flash interval to thereby conserve electrical energy.

26. A method according to claim 22, and further comprising flashing the first indicator light for a predetermined flash duration over a predetermined flash interval to thereby conserve electrical energy.

* * * * *